US00RE37458B1

(19) United States
(12) Reissued Patent
Horsch

(10) Patent Number: US RE37,458 E
(45) Date of Reissued Patent: Nov. 27, 2001

(54) HYDRO-MECHANICAL TRANSMISSION

(75) Inventor: Joachim Horsch, Lombard, IL (US)

(73) Assignee: Case Corporation, Racine, WI (US)

(21) Appl. No.: 09/496,181

(22) Filed: Jan. 31, 2000

Related U.S. Patent Documents

Reissue of:
(64) Patent No.: 5,865,700
Issued: Feb. 2, 1999
Appl. No.: 08/847,195
Filed: May 1, 1997

(51) Int. Cl.[7] ..... F16H 47/04
(52) U.S. Cl. ..... 475/72; 475/78; 475/82
(58) Field of Search ..... 475/72, 76, 78, 475/80, 81, 82; 180/243, 307, 53.1; 56/12.6, 10.1, 11.1, 10.8

(56) References Cited

U.S. PATENT DOCUMENTS

| | | | | |
|---|---|---|---|---|
| 3,396,607 | * | 8/1968 | Ross | 475/82 |
| 3,714,846 | | 2/1973 | Louis et al. . | |
| 3,744,344 | | 7/1973 | Olsen et al. . | |
| 3,796,111 | | 3/1974 | Schauer . | |
| 3,903,756 | | 9/1975 | Hamma . | |
| 4,019,404 | | 4/1977 | Schauer . | |
| 4,138,907 | | 2/1979 | Melles . | |
| 4,259,881 | | 4/1981 | Myerle . | |
| 4,348,855 | * | 9/1982 | DePauw et al. | 56/10.2 |
| 4,471,668 | | 9/1984 | Elsner . | |
| 4,487,002 | * | 12/1984 | Kruse et al. | 56/10.2 |
| 4,694,648 | * | 9/1987 | Beck, Jr. | 60/452 |
| 4,913,004 | | 4/1990 | Panoushek et al. . | |
| 5,024,278 | | 6/1991 | Shuknecht . | |
| 5,494,142 | | 2/1996 | Kale . | |
| 5,505,267 | | 4/1996 | Orbach et al. . | |
| 5,549,185 | | 8/1996 | Kale . | |
| 5,667,452 | | 9/1997 | Coutant . | |
| 5,873,227 | | 2/1999 | Arner . | |

FOREIGN PATENT DOCUMENTS

| | | | |
|---|---|---|---|
| 43 11 084-C1 | * | 9/1994 | (DE) . |
| 0 444 472-A3 | * | 2/1991 | (EP) . |
| 0444472-A3 | * | 9/1991 | (EP) . |

* cited by examiner

*Primary Examiner*—Dirk Wright
(74) *Attorney, Agent, or Firm*—Foley & Lardner

(57) ABSTRACT

A hydro-mechanical transmission for an agricultural work vehicle is provided including a motor, a clutch and a differential assembly. The clutch which is rotatably supported by a housing includes first and second input shafts and a first output shaft. The first output shaft is configured to selectively couple to the first and second input shafts. The motor is coupled to the second input shaft, and the differential assembly which is rotatably supported by the housing is coupled to the first output shaft. The differential assembly includes a third input shaft coupled to the first output shaft, and a fourth input shaft coupled to the motor, and a second output shaft. The speed of the second output shaft is a combination of the speeds of the third and fourth input shafts.

28 Claims, 3 Drawing Sheets

HYDRO-MECHANICAL TRANSMISSION

Matter enclosed in heavy brackets [ ] appears in the original patent but forms no part of this reissue specification; matter printed in italics indicates the additions made by reissue.

FIELD OF THE INVENTION

The present invention relates to an improved transmission of the type including a combination of hydrostatic (fluid) and mechanical drives. More specifically, the present invention relates to a transmission which may transmit power solely through the hydrostatic portion of the transmission, solely through the geared portion of the transmission, or in combination through both the hydrostatic and geared portions of the transmission.

BACKGROUND OF THE INVENTION

Both hydrostatic transmissions and geared transmissions are used in agricultural and construction equipment to transmit power from engines to equipment for accomplishing a desired task. For example, transmissions are used to properly transmit power to the wheels of a vehicle, or to a vehicle implement such as a rotor on an agricultural combine. However, depending upon the application, it is seldom that either a geared transmission or a hydrostatic transmission will provide the best performance for all of the transmission requirements. Two important considerations in selecting transmissions are their efficiency and range of input and output speed variability. In general, hydrostatic transmissions provide extremely high speed variability between the input and output, but are less efficient than geared transmissions.

Turning to the rotor of a combine, such rotors usually are relatively high in mass, and as the size of combines increases, become increasingly larger. Typical combines now use variable pulley belt drives to transmit power to the rotors. However, the power required to rotate the larger rotors of larger combines cannot be effectively transmitted through conventional belt drives. Also, the current machines have a provision to manually rotate the rotors in reverse, after they become clogged with excess material. This is not only cumbersome but also less effective with larger machines. Accordingly, in the larger combines there is a move toward using geared transmissions to drive the rotor and provide an engine-powered reversing feature. However, one of the problems with geared transmissions is the limited variability in speed. This limitation restricts the operator's ability to optimize rotor speed to obtain peak harvesting efficiency. Another problem with geared transmissions is the amount of energy which must be dissipated by the input clutch when engaging the power source to initiate rotation of the rotor. Due to the high inertia of large combine rotors, initiating rotation of the rotor when the combine engine is rotating at operating speed results in substantial wear of the input clutch to the transmission.

In view of the need for an improved transmission having improved variability between transmission input and output speed while maintaining efficiency, it would be desirable to combine the features of a hydrostatic transmission with a geared transmission.

SUMMARY OF THE INVENTION

The present invention provides a hydro-mechanical transmission. The transmission includes a clutch rotatably supported by a housing. The clutch includes a first input shaft, a second input shaft and a first output shaft, and is configured to selectively couple the output shaft to the first and second input shafts. The transmission also includes a motor coupled to the second input shaft, and a differential assembly coupled to the first output shaft. The differential assembly is rotatably supported by the housing, and includes a third input shaft coupled to the first output shaft, a fourth input shaft coupled to the motor, and second output shaft. The speed of the second output shaft is a combination of the speeds of the third and fourth input shafts.

The present invention also provides a method for increasing the speed of the output of the hydro-mechanical transmission. The method includes the steps of operating the first input shaft at a first rotational speed, operating the clutch to couple only the second input shaft with the first output shaft, and increasing the rotational speed of the motor to a speed which rotates the second output shaft at a second rotational speed such that the ratio of the first and second rotational speeds is within a predetermined range of a predetermined ratio. After the ratio of the first and second rotational speeds is within the predetermined range, the clutch is operated to couple the first input shaft with the first output shaft.

The present invention further provides a threshing system for a combine including a clutch having a first input shaft, a second input shaft and a first output shaft. The clutch is configured to selectively couple the output shaft to the first and second input shafts. The system also includes a hydraulic motor coupled to the second input shaft and a differential assembly. The differential assembly includes a third input shaft coupled to the first output shaft, a fourth input shaft coupled to the motor, and a second output shaft. The speed of the second output shaft is a combination of the speeds of the third and fourth input shafts. The system also includes an internal combustion engine coupled to the first input shaft, a hydraulic pump coupled to the engine and in fluid communication with the hydraulic motor, and a threshing rotor coupled to the second output shaft.

The present invention still further provides a method for increasing the speed of the rotor of the threshing system. The method includes the steps of operating the first input shaft at a first rotational speed defined by the speed of the engine, operating the clutch to couple only the second input shaft with the first output shaft, and increasing the rotational speed of the motor to a speed which rotates the rotor at a second rotational speed such that the ratio of the first and second rotational speeds is within a predetermined range of a predetermined ratio. After the ratio of the first and second rotational speeds is within the predetermined range, the clutch is operated to couple the first input shaft with the first output shaft.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
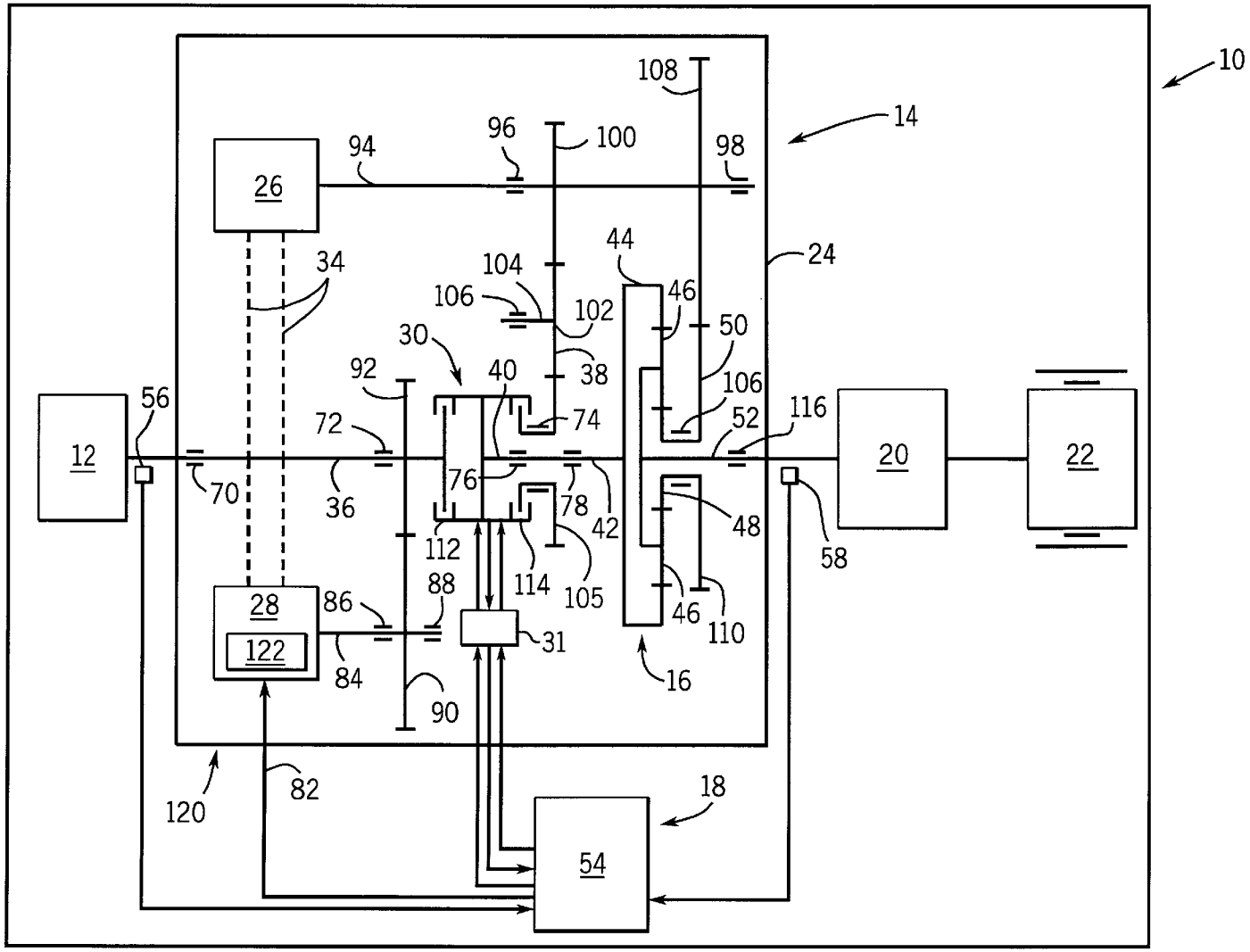
FIG. 1 is a schematic block diagram of a transmission connected to a rotor of a combine.

FIG. 1 is a schematic diagram of a vehicle, such as an agricultural combine, designated by the reference numeral 10. Combine 10 includes an engine 12 mechanically coupled to a hydro-mechanical transmission 14. Hydro-mechanical transmission 14 selectively drives a differential assembly 16 at various gear ratios, as commanded by an operator and controlled by a control circuit 18. Differential assembly 16 drives a multi-speed gear transmission 20 which in turn drives a portion of an agricultural implement, such as a rotor 22.

Hydro-mechanical transmission 14 is supported in combine 10 by a housing or support frame 24. Hydro-mechanical transmission 14 includes a motor 26, a pump 28, a clutch assembly 30 and differential assembly 16. Motor 26 is a hydraulic motor, and pump 28 is preferably an electronically controlled variable displacement hydraulic pump. By changing the volume in pump 28 for a fixed pump input speed, pump 28 controls the speed of motor 26. Hydrostatic pump 28 and motor 26 are operated in a closed circuit and connected to one another by hydraulic lines 34 and appropriate fluid filters and storage tanks (not shown) as required.

Clutch 30 of hydro-mechanical transmission 14 is rotatably supported relative to housing 24 by an input shaft 36 and an output shaft 40. Input shaft 36 is rotatably supported by bearings 70 and 72, and output shaft 40 is rotatably supported by bearings 76 and 78. Clutch 30 has two input shafts 36 and 38. First input shaft 36 is coupled to engine 12 and to pump 28. A shaft 84 extends from pump 28 and is rotatably supported by bearings 86 and 88. Shaft 84 rotates a gear 90. Gear 90 meshes with a gear 92 mounted on first input shaft 36, thereby enabling pump 28 to drive first input shaft 36.

Second input shaft 38 of clutch 30 is supported by bearing 74 and coupled to motor 26. Extending from motor 26 is a shaft 94 which is rotatably supported by bearings 96 and 98. Shaft 94 rotates a gear 100 which meshes with a gear 102. Gear 102 is coupled to a shaft 104 which is rotatably supported by bearing 106. Gear 102 also meshes with a gear 105 mounted on second input shaft 38. Thus, motor 26 may rotate second input shaft 38.

Clutch 30 has output shaft 40 which may be selectively engaged to either first input shaft 36 or second input shaft 38. As will be discussed in further detail below, output shaft 40 may be engaged either to first input shaft 36 by turning on a hydro-mechanical clutch 112 or to second input shaft 38 by turning on a hydrostatic clutch 114. When output shaft 40 is coupled to first input shaft 36, clutch 30 is driven by engine 12. When output shaft 40 is coupled to second input shaft 38, clutch 30 is driven by motor 26.

Differential assembly 16 has a first input shaft 42 which is the same as or coupled to output shaft 40 of clutch 30. As shown in FIG. 1, differential assembly 16 may be a planetary gear arrangement including a ring gear 44, a plurality of planetary gears 46 supported by a shaft 52 and a sun gear 48. First input shaft 42 of differential assembly 16 is coupled to ring gear 44. Differential assembly 16 also has a second input shaft 50 which rotates on bearing 106. Second input shaft 50 couples motor 26 to sun gear 48. Shaft 94 which extends from motor 26 also rotates a gear 108. Gear 108 meshes with a gear 110 mounted on second input shaft 50 of differential assembly. Thus, motor 26 may rotate second input shaft 50 of differential assembly 16.

Output shaft 52 of differential assembly 16 is rotatably supported by bearing 116 and rotates at a speed which is a combination of the speeds of first and second input shafts 42 and 50, respectively, of differential assembly 16. For example, 0.728 times the speed of shaft 42 plus 0.272 times the speed of shaft 50 equals the speed of shaft 52. Output shaft 52 may drive wheels on an axle (not shown) of vehicle 10 or an agricultural implement, such as motor 22 as shown.

In a preferred embodiment, output shaft 52 of differential assembly 16 is coupled to a multi-speed transmission 20 which in turn drives rotor 22. As will be appreciated by one skilled in the art, multi-speed transmission 20 (e.g., four speed) may be any one of a number of types of transmissions, including synchronous power shaft, jaw clutch and standard gearbox transmissions.

Figure 2:
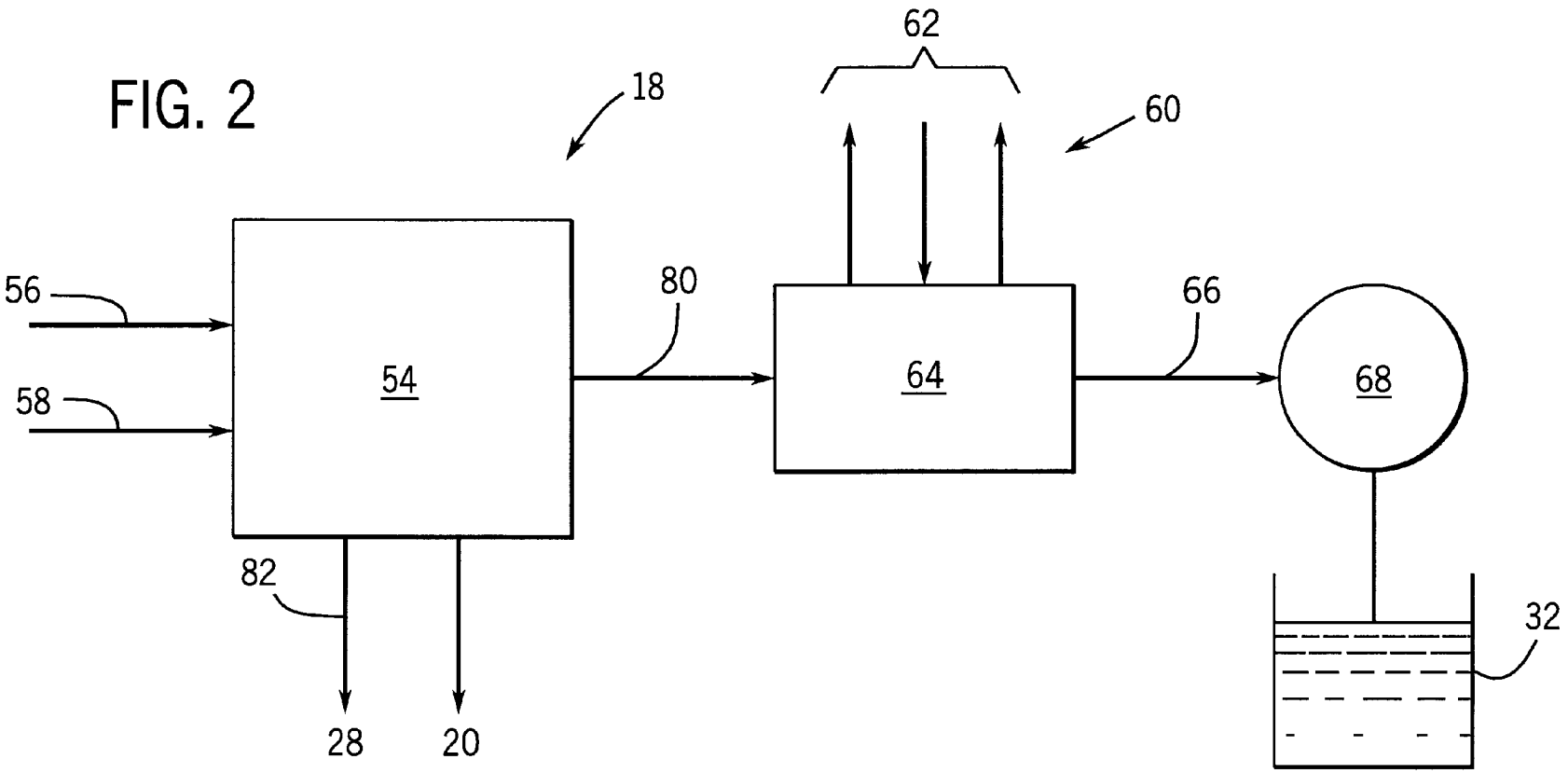
FIG. 2 is a schematic block diagram of a control circuit of the combine shown in FIG. 1.

As shown in FIGS. 1 and 2, combine 10 also includes a control circuit 18. Control circuit 18 has a system control 54 for controlling the speed of shaft 52 connected to multi-speed transmission 20 which in turn rotates rotor 22. Combine rotor 22 is used to harvest different crops, including corn, oats, wheat, soybeans and rice. The optimal rotor speed for harvesting depends on the type of crop to be harvested as well as other conditions, such as the amount of moisture and the volume of the crop. Control circuit 18 includes an input speed transducer 56 which monitors the rotational speed of first input shaft 36 of clutch 30 and an output speed transducer 58 which monitors the rotational speed of output shaft 52 of differential assembly 16.

Control circuit 18 is connected to clutch 30 via a clutch actuating circuit 60 and clutch actuating assembly 31, so that system control 54 can regulate the engagement of output shaft 40 to first and second input shafts 36 and 38, respectively. By activating hydro-mechanical clutch 112 or hydrostatic clutch 114, system control 54 may engage output shaft 40 with respective input shafts 36 and 38. As shown in FIG. 2, clutch actuating circuit 60 includes a hydraulic circuit 62, a solenoid operated valve arrangement 64, and hydraulic fluid source 32. Circuit 62 is coupled to clutch 30 to engage and disengage output shaft 40 from first and second input shafts 36 and 38, respectively. Arrangement 64 may be pulse width modulated valves controlled by signals applied to arrangement 64 by system control 54 via a signal bus 80.

Furthermore, control circuit 18 regulates the speed of motor 26 by applying appropriate control signals or speed signals to pump 28 via signal bus 82 to maintain a predetermined speed for output shaft 52 of differential assembly 16 or to maintain a predetermined speed difference between first input shaft 36 of clutch 30 and output shaft 52.

Figure 3:
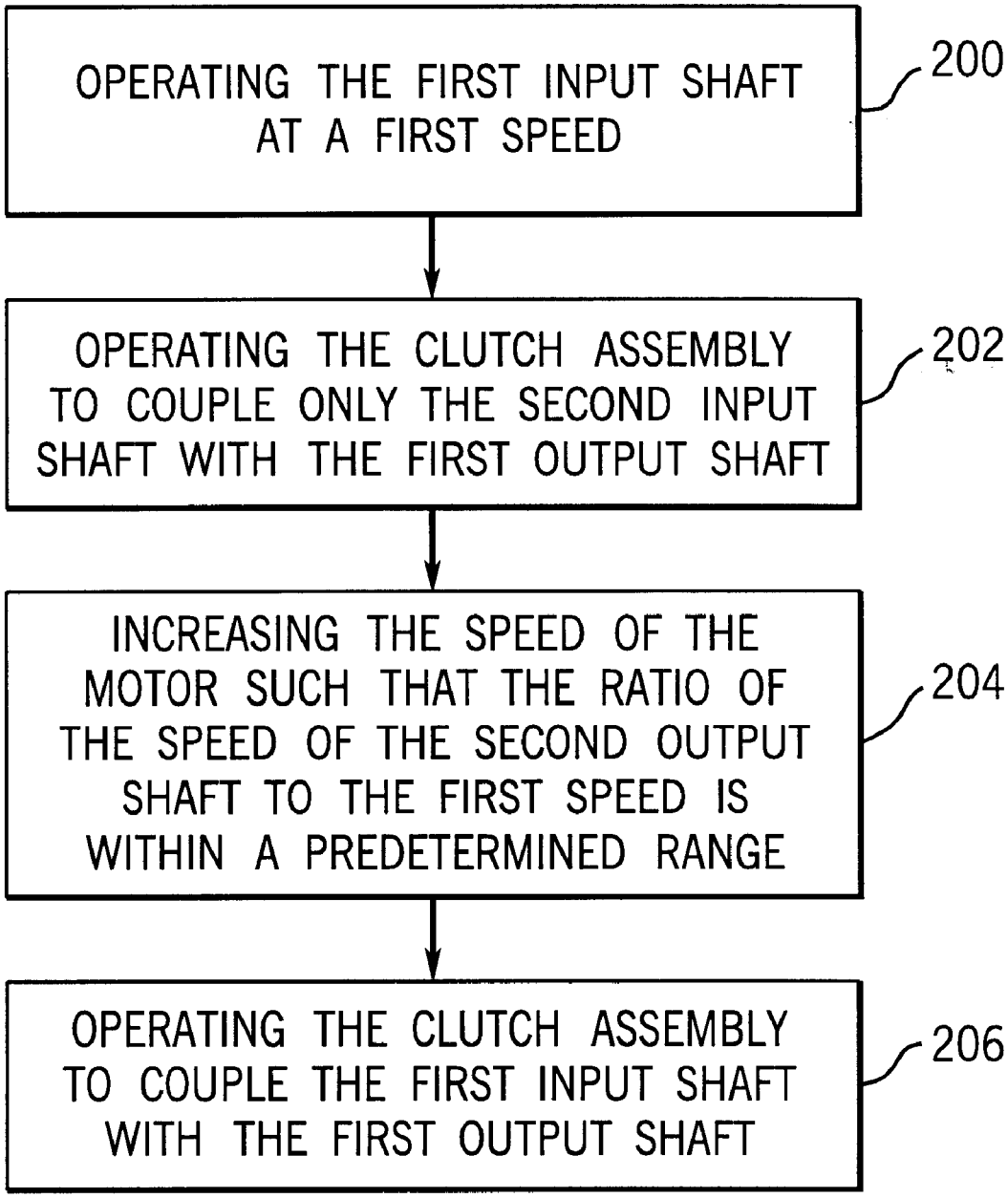
FIG. 3 is a flowchart of a method of operating the transmission of FIGS. 1 and 2.

Thus, with reference to the method depicted in FIG. 3, hydro-mechanical transmission 14 preferably operates as follows. When engine 12 is running, pump 28 and first input shaft 36 are powered and rotated at a first rotational speed at a step 200. First input shaft 36 is initially disengaged from clutch 30, and shaft 94 of motor 26 is coupled to shaft 40 through the intervening drive train elements and clutch 30 at a step 202. The speed of motor 26 is increased by increasing the displacement of pump 28 until the ratio of the rotational speeds of shafts 36 and 52 is within a predetermined range of a predetermined ratio at a step 204.

Once the ratio is within the predetermined range, clutch 30 may be disengaged from second input shaft 38 and engaged to first input shaft 36 at a step 206. With shaft 38 disengaged, varying the speed of motor 26 enables hydro-mechanical transmission 14 to change the speed of shaft 52 without altering the speed of engine 12. Thus, with hydro-mechanical transmission 14 greater variability in speed is available, allowing combine 10 to harvest crops more efficiently by controlling the speed of rotor 22 more precisely.

Hydro-mechanical transmission 14, therefore, has several benefits. Rotor 22 may be accelerated from start-up to an operating speed in any gear without the use of a slipping, high energy clutch. Rotor 22 may also be reversed and forwarded at high torque without using a high energy clutch. In addition, since braking is accomplished hydrostatically, within a certain range rotor 22 may be decelerated without the need for brakes. Furthermore, if transmission 20 is of the type which can be electronically shifted control 54 can be configured to control shifting and gear synchronization, if necessary, speed matching (hydrostatic synchronization). Finally, the shift between the pure hydrostatic mode and the hydro-mechanical mode may be made at synchronism without torque interruption.

It will be understood that the foregoing description is of a preferred embodiment of this invention and that the invention is not limited to the specific forms shown. Other modifications may be made in the design and arrangement of other elements without departing from the scope of the invention as expressed in the appended claims.

What is claimed is:

1. A hydro-mechanical transmission comprising:

a transmission housing;

a clutch assembly rotatably supported by the housing, the clutch assembly including a first input shaft, a second input shaft and a first output shaft, the clutch assembly being configured to selectively couple the output shaft to the first and second input shafts;

a motor coupled to the second input shaft;

a differential assembly rotatably supported by the housing, the assembly including a third input shaft coupled to the first output shaft, a fourth input shaft coupled to the motor, and a second output shaft, wherein the speed of the second output shaft is a combination of the speeds of the third and fourth input shafts;

an output speed transducer supported by the housing to generate an output speed signal representative of the speed of the second output shaft;

an electrically controlled clutch actuating circuit; and a control circuit coupled to the speed transducer and the actuating circuit to control the engagement and disengagement of the first and second input shafts to the first output shaft.

2. The transmission of claim 1, wherein the differential assembly is a planetary gear arrangement comprising:

a ring gear coupled to the third input shaft;

a sun gear coupled to the fourth input shaft; and at least one planetary gear coupled to the output shaft and engaged with the ring and sun gears.

3. The transmission of claim 1, wherein the motor is a hydraulic motor.

4. The transmission of claim 2, wherein the motor is a hydraulic motor.

5. The transmission of claim 4, further comprising:

a hydraulic pump coupled to the first input shaft; and a hydraulic conduit coupled between the motor and the pump to convey hydraulic fluid therebetween.

6. The transmission of claim 1, further comprising:

an input speed transducer supported by the housing to generate an input speed signal representative of the speed of the first input shaft.

7. The transmission of claim 6, further comprising:

an electrically controlled motor speed control coupled to the motor and the control circuit, wherein the control circuit applies a speed signal to the control to operate the control to control the speed of the motor to maintain a selected speed difference between the first input shaft and the second output shaft.

8. The transmission of claim 7, wherein the clutch actuating circuit comprises:

a hydraulic actuating assembly coupled to the clutch assembly to engage and disengage the output shaft from the first and second input shafts;

a hydraulic fluid source; and a solenoid arrangement coupled to the control circuit to control the flow of hydraulic fluid between the actuating assembly and the fluid source.

9. The transmission of claim 7, wherein the motor is a hydraulic motor and the motor speed control comprises a hydraulic pump coupled to the first input shaft and in fluid communication with the hydraulic motor, the pump having an electronic displacement control coupled to the control circuit.

10. The transmission of claim 7, further comprising a multi-speed gear transmission coupled to the second output shaft.

11. A method for increasing the speed of the output of a transmission of the type including: a transmission housing; a clutch assembly rotatably supported by the housing, the clutch assembly including a first input shaft, a second input shaft and a first output shaft, the clutch assembly being configured to selectively couple the output shaft to the first and second input shafts; a motor coupled to the second input shaft; and a differential assembly rotatably supported by the housing, the assembly including a third input shaft coupled to the first output shaft, a fourth input shaft coupled to the motor, and a second output shaft, wherein the rotational speed[s] of the second output shaft is a combination of the rotational speeds of the third and fourth input shafts, and the rotational speeds of the first input shaft and the second output shaft *are a predetermined ratio when the fourth input shaft* is stationary; the method comprising the steps of:

operating the first input shaft at a first rotational speed;

operating the clutch assembly to couple only the second input shaft with the first output shaft;

monitoring the first rotational speed;

increasing the rotational speed of the motor to a speed which rotates the second output shaft at a second rotational speed such that the ratio of the first and second rotational speeds is within a predetermined range of the predetermined ratio; and operating the clutch assembly to couple the first input shaft with the first output shaft after the ratio of the first and second rotational speeds is within the predetermined range.

12. The method of claim 11, further comprising the step of operating the clutch assembly to disengage the second input shaft from the first output shaft.

13. The method of claim 12, further comprising the step of setting the rotational speed of the motor to a speed which rotates the fourth input shaft at a rotational speed which rotates the second output shaft at a third rotational speed such that the ratio of the first and third rotational speeds is greater than the predetermined ratio.

14. The method of claim 12, further comprising the step of setting the rotational speed of the motor to a speed which rotates the fourth input shaft at a rotational speed which rotates the second output shaft at a fourth rotational speed such that the ratio of the first and fourth rotational speeds is less than the predetermined ratio.

15. A threshing system for a combine comprising:

a transmission housing;

a clutch assembly rotatably supported by the housing, the clutch including a first input shaft, a second input shaft and a first output shaft, the clutch assembly being configured to selectively couple the output shaft to the first and second input shafts;

a hydraulic motor coupled to the second input shaft;

a differential assembly rotatably supported by the housing, the assembly including a third input shaft coupled to the first output shaft, a fourth input shaft coupled to the motor, and a second output shaft, wherein the speed of the second output shaft is a combination of the speeds of the third and fourth input shafts;

an internal combustion engine coupled to the first input shaft;

a hydraulic pump coupled to the engine and in fluid communication with the hydraulic motor; and a threshing rotor coupled to the second output shaft.

16. The system of claim 15, wherein the differential assembly is a planetary gear arrangement comprising:

a ring gear coupled to the third input shaft;

a sun gear coupled to the fourth input shaft; and at least one planet gear coupled to the output shaft and engaged with the ring and sun gears.

17. The system of claim 15, further comprising:

an output speed transducer supported by the housing to generate an output speed signal representative of the speed of the second output shaft;

an electrically controlled clutch actuating circuit; and a control circuit coupled to the speed transducers and the actuating circuit to control the engagement and disengagement of the first and second input shafts to the first output shaft.

18. The system of claim 17, wherein the hydraulic pump is an electronically controlled variable displacement pump.

19. The system of claim 18, wherein the control circuit is coupled to the variable displacement pump to control the speed of the motor to maintain a selected speed difference between the first input shaft and the second output shaft.

20. The system of claim 19, wherein the clutch actuating circuit comprises:

a hydraulic actuating assembly coupled to the clutch assembly to engage and disengage the output shaft from the first and second input shafts;

a hydraulic fluid source; and a solenoid arrangement coupled to the control circuit to control the flow of hydraulic fluid between the actuating assembly and the fluid source.

21. The system of claim 15, further comprising a multi-speed gear transmission coupled to the second output shaft.

22. A method for increasing the speed of a threshing system rotor using a transmission including: a transmission housing, a clutch assembly rotatably supported by the housing, the clutch assembly including a first input shaft, a second input shaft and a first output shaft, the clutch assembly being configured to selectively couple the output shaft to the first and second input shafts; a hydraulic motor coupled to the second input shaft; a differential assembly rotatably supported by the housing; the assembly including a third input shaft coupled to the first output shaft; a fourth input shaft coupled to the motor, and second output shaft coupled to the threshing rotor, wherein the rotational speed of the rotor is a combination [o] *of* the rotational speeds of the third and fourth input shafts, and the rotational speeds of the first input shaft and the second output shaft are a predetermined ratio[n] when the fourth input shaft is stationary; an internal combustion engine coupled to the first input shaft; and a hydraulic pump coupled to the engine and in fluid communication with the hydraulic motor; the method comprising the steps of:

operating the first input shaft at a first rotational speed defined by the speed of the engine;

operating the clutch assembly to couple only the second input shaft with the first output shaft;

monitoring the first rotational speed;

increasing the rotational speed of the motor to a speed which rotates the rotor at a second rotational speed such that the ratio of the first and second rotational speeds is within a predetermined range of the predetermined ratio; and operating the clutch assembly to couple the first input shaft with the first output shaft after the ratio[n] of the first and second rotational speeds is within the predetermined range.

23. The method of claim 22, further comprising the step of operating the clutch to disengage the second input shaft from the first output shaft.

24. The method of claim 22, further comprising the step of setting the rotational speed of the motor to a speed which rotates the fourth input shaft at a rotational speed which rotates the second output shaft at a third rotational speed such that the ratio of the first and third rotational speeds is greater than the predetermined ratio.

25. The method of claim 22, further comprising the step of setting the rotational speed of the motor to a speed which rotates the fourth input shaft at a rotational speed which rotates the second output shaft at a fourth rotational speed such that the ratio of the first and fourth rotational speeds is less than the predetermined ratio.

26. A hydro-mechanical transmission comprising:

a transmission housing;

a clutch assembly rotatably supported by the housing, the clutch assembly including a first input shaft, the clutch assembly being configured to selectively couple the output shaft to the first and second input shafts;

a motor coupled to the second input shaft;

a differential assembly rotatably supported by the housing, the assembly including a third input shaft coupled to the first output shaft, a fourth input shaft coupled to the motor, and a second output shaft, wherein the speed of the second output shaft is a combination of the speeds of the third and fourth input shafts;

a speed transducer supported by the housing to generate a speed signal representative of the speed of one of the first input shaft and the second output shaft;

an electrically controlled clutch actuating circuit; and a control circuit coupled to the speed transducer and the actuating circuit to control the engagement and disengagement of the first and second input shafts to the first output shaft.

27. The system of claim 15, further comprising:

an input speed transducer supported by the housing to generate an input speed signal representative of the speed of the first input shaft;

an output speed transducer supported by the housing to generate an output speed signal representative of the speed of the second output shaft;

an electrically controlled clutch actuating circuit; and a control circuit coupled to the speed transducers and the actuating circuit to control the engagement and disengagement of the first and second input shafts to the first output shaft.

28. A threshing system for a combine comprising:

a transmission housing;

a clutch rotatably supported by the housing, the clutch including a first input shaft, a second input shaft and a first output shaft, the clutch being to selectively couple the output shaft to the first and second input shafts;

a hydraulic motor coupled to the second input shaft;

a differential assembly rotatably supported by the housing, the assembly including a third input shaft coupled to the first output shaft, a fourth input shaft coupled to the motor, and a second output shaft, wherein the speed of the second output shaft is a combination of the speeds of the third and fourth input shafts;

an internal combustion engine coupled to the first input shaft;

a hydraulic pump coupled to the engine and in fluid communication with the hydraulic motor;

a multi-speed gear transmission coupled to the second output shaft; and a threshing rotor coupled to the second output shaft.

* * * * *